H. PIERINI.
MOUSE TRAP.
APPLICATION FILED APR. 25, 1914.

1,126,563.

Patented Jan. 26, 1915.

Witnesses
W. C. Fielding
Alan F. Garner

Inventor
Humbert Pierini
By Munn & Co.
Attorneys

UNITED STATES PATENT OFFICE.

HUMBERT PIERINI, OF REDLEAF, ARKANSAS.

MOUSE-TRAP.

1,126,563.

Specification of Letters Patent.

Patented Jan. 26, 1915.

Application filed April 25, 1914. Serial No. 834,550.

*To all whom it may concern:*

Be it known that I, HUMBERT PIERINI, a subject of the King of Italy, and a resident of Redleaf, in the county of Chicot and State of Arkansas, have invented a new and useful Improvement in Mouse-Traps, of which the following is a specification.

This invention relates to an improvement in animal traps, and more particularly to an improved mouse trap.

One of the principal objects of the invention is to provide an animal trap having a platform adapted to tip under the weight of an animal, for precipitating the animal into a receptacle, and having means for automatically resetting the platform so that it will always be ready for use.

Another object of the invention is to provide a trap of the class described, which will be durable, efficient in operation, sanitary, and inexpensive to manufacture.

Figure 1:
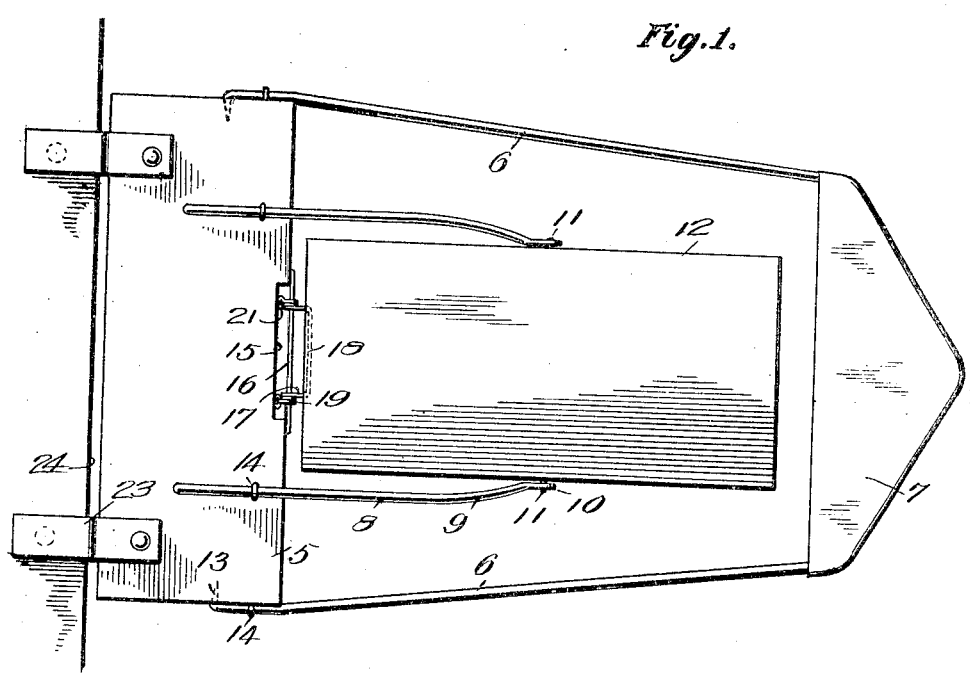
Figure 2:
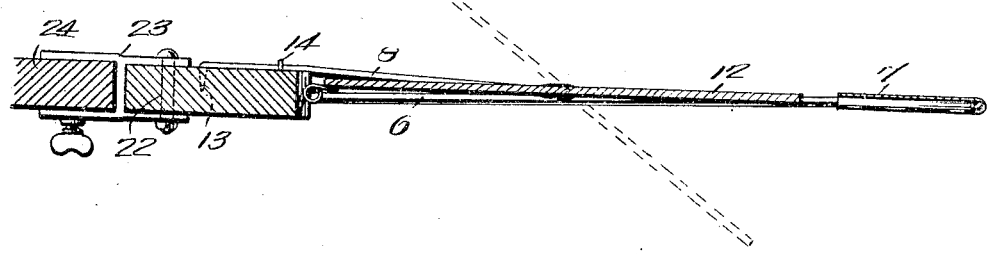
Figure 3:
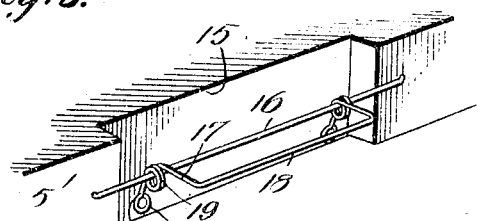

With these and other objects in view which will become apparent as the description proceeds, the invention resides in the construction, combination, and arrangement of parts hereinafter more fully described and claimed and illustrated in the accompanying drawings in which like characters of reference indicate like parts throughout the several figures, of which Figure 1, represents a top plan view of the trap, Fig. 2, represents a vertical longitudinal central sectional view taken therethrough, and Fig. 3, represents a detail perspective view showing the construction of the latch spring.

Referring more particularly to the drawing, the base of the trap is indicated at 5, and comprises a rectangular or other suitably shaped block of wood or other material, and the block has secured to its opposite ends, the ends of a length of wire, bent so as to form arms 6, extending laterally of block 5, and supporting at a distance therefrom a platform 7, on which suitable bait may be placed, said platform being formed of a strip of metal bent at its edges around the wire as shown in Fig. 2. The wire is bent at its central portion in such shape that the platform will be triangular in shape, but it will be understood that the wire may be bent on a regular curve or in other suitable and attractive form.

Secured upon the top of the block, in spaced and parallel relation, and extending laterally therefrom in the same direction as, and between arms 6, are a pair of rods or wires 8, which at their outer ends are bent slightly toward each other as at 9, and flattened as at 10, to provide bearings for pins 11, which are positioned in the longitudinal edges of a tilting platform 12 and exactly opposite each other, said pins being disposed at a short distance to one side of the medial lateral line of the tilting platform, so that the weight of the platform on one side of the pivot pins is somewhat greater than the weight of the platform on the other side. The rear ends of arms 6 and rods 8, are sharpened and bent at right angles, so that they may be driven in the block 5, as indicated at 13, and staples or other suitable fastening means 14 may be utilized for securing the arms and rods in place.

The lateral edge of block 5 adjacent arms 8 and between them, is recessed as at 15, and spanning said recess is a length of wire or rod 16, on which is pivoted the latch spring 17. This spring is preferably formed of a single piece of resilient wire, bent so as to form a substantially U-shaped tongue portion 18, projecting from rod 16 away from block 5, the ends of the resilient wire being coiled, as at 19, about the rods 16, and being then bent at right angles to tongue 18, as as 20, and formed into loops 21 which normally bear against the bottom of recess 15. The diameter of spirals 19 is considerably greater than the diameter of rod 16 so that the latch is free to rotate thereon, and the weight of the latch is so disposed that the loops 21 are normally seated against the floor of the recess.

When in normal position, the longer end of tilting platform 12, is disposed horizontally toward block 5 and barely engages at its end over tongue 18. Upon the movement of an animal on to the opposite or shorter end of the tilting platform, the weight of the animal will immediately overcome the weight of the longer portion of the platform, hence tilting the platform as indicated in dotted lines in Fig. 2 and precipitating the animal into a receptacle, not shown, which may be placed at a convenient distance below the trap, said receptacle being filled with water if so desired.

The momentum imparted to the platform will be enough to rotate the same until the heavy end of the platform moves above the pivot pins 11 and passes them, whereupon the weight of the heavy end will swing the platform around until the end engages beneath tongue 18, and upon further movement will raise the tongue to allow passage of the heavy end beyond the same, whereupon the tongue will fall back into normal position and the momentum of the platform having been spent, the heavy end will settle back upon the top of the tongue 18, and since the latch is made of spring metal, there will be no shocks which might tend to disturb the delicate adjustment of the trap. The distance between the block 5, and the bait platform is great enough to allow free rotation of the tilting platform, and the length of the shorter end of the platform is such that said end upon rotation of the platform will pass the latch without striking tongue 18.

The block is provided near its ends with openings 22, to receive screws or other fastening means for securing the trap to a shelf or other object at a distance from the floor, or to receive a suitable clamp 23, as indicated in the drawing, by means of which the trap may be clamped to a shelf, a chair, a table or other suitable object, the object to which the trap is secured being indicated by the numeral 24.

It has been found that a trap constructed according to my invention, is extremely efficient in operation, both as to its purpose and as to the automatic resetting of the tilting platform.

Although I have described the preferred embodiment of my invention, I may desire to make such changes in the construction, combination and arrangement of parts thereof as do not depart from the spirit of the invention and the scope of the appended claims.

I claim:

1. A trap comprising a base block, a bait platform, arms connecting them, a tilting platform disposed between the bait platform and the block, means for rotatably supporting the platform in such manner that one end is slightly heavier than the opposite end, said base block provided with a recess, a rod spanning the recess and a latch pivoted on the rod and adapted to normally maintain the heavier end of the platform, substantially as described.

2. A trap comprising a base block, a bait platform disposed in spaced relation thereto, a tilting platform disposed between said base block and bait platform, means for rotatably supporting said tilting platform in such a manner that one end of the same is slightly heavier than the opposite end, a spring latch pivotally supported upon said base block, the heavier end of said tilting platform normally resting upon said latch, said platform adapted to be rotated upon the placing of a weight on the lighter end thereof, and adapted to automatically reset itself.

3. A trap comprising a base block, means for securing the same to a suitable object, a bait platform, means for securing the latter in spaced relation to said base block, a rotatable tilting platform, means for supporting the same, and a latch operable independently of the bait platform and adapted to prevent rotation of said tilting platform in one direction, and to yield under pressure of said tilting platform when the latter is rotated in the opposite direction.

4. A trap comprising a base, a bait platform disposed in spaced relation thereto, a tilting platform rotatably positioned between said base and bait platform, and means independent of the bait platform for normally holding said tilting platform in set position, said means adapted to yield under pressure of said tilting platform, said tilting platform being heavier on one side of its pivot point than on the other.

5. A trap including a base block, and a tilting platform disposed adjacent the same, means for rotatably supporting the platform in such manner that one end of the same is heavier than the other, said base block provided with a recess, a rod spanning the recess and a latch pivoted on said rod, said latch comprising a strip of wire bent to form a substantially U-shaped tongue, said wire at its ends being coiled around said rod and bent at right angles to the tongue and provided with loops normally resting against the floor of the recess, said tongue adapted to normally support the heavier end of the tilting platform, said latch upon rotation of said platform adapted to allow the passage of the heavier end of the platform in one direction but to prevent passage of the same in the opposite direction.

6. A trap including a base, a bait supporting element, a rotatable tilting platform journaled off center adjacent the base, and automatic means independent of the bait supporting element for normally maintaining the tilting platform in set position, and adapted to yield under pressure of said tilting platform when the latter is rotated away from the base.

7. A trap including a bait supporting means, a rotary platform journaled off center, and means adapted to yield under pressure of the rotary platform and automatically operating independently of the bait supporting means to maintain the rotary platform in set position and to reset the rotary platform.

HUMBERT PIERINI.

Witnesses:
 Thos. G. Hardie,
 C. D. Owens.